United States Patent
Orlando et al.

(10) Patent No.: US 7,779,289 B2
(45) Date of Patent: Aug. 17, 2010

(54) METHODS AND DATA PROCESSING SYSTEMS FOR SHARING A CLOCK BETWEEN NON-SECURED AND SECURED TASKS

(75) Inventors: William Orlando, Peynier (FR); Stéphan Courcambeck, Plan de Cuques (FR)

(73) Assignee: STMicroelectronics S.A., Montrouge (FR)

( * ) Notice: Subject to any disclaimer, the term of this patent is extended or adjusted under 35 U.S.C. 154(b) by 768 days.

(21) Appl. No.: 11/707,228

(22) Filed: Feb. 14, 2007

(65) Prior Publication Data

US 2007/0220297 A1  Sep. 20, 2007

(30) Foreign Application Priority Data

Dec. 15, 2006  (FR) .................... 06 50541

(51) Int. Cl.
G06F 1/04 (2006.01)
(52) U.S. Cl. .................... 713/502; 713/500; 713/503
(58) Field of Classification Search ............... 713/502, 713/503
See application file for complete search history.

(56) References Cited

U.S. PATENT DOCUMENTS

| 5,636,373 | A | 6/1997 | Glendening et al. |
| 5,994,917 | A | 11/1999 | Wuidart |
| 6,209,106 | B1 | 3/2001 | Kubala et al. |
| 6,452,980 | B1 * | 9/2002 | Zalud et al. ............ 375/285 |
| 6,535,519 | B1 * | 3/2003 | Ghodrat ................ 370/421 |
| 7,076,802 | B2 * | 7/2006 | Poisner ................. 726/22 |
| 2004/0205368 | A1 | 10/2004 | Lange-Pearson et al. |
| 2007/0081454 | A1 * | 4/2007 | Bergamasco et al. ...... 370/229 |

OTHER PUBLICATIONS

French Search Report from French Patent Application 06/50541, filed Feb. 15, 2006.
Hu W-M, Institute of Electrical and Electronics Engineers: "Reducing timing channels with fuzzy time" Proceedings of the Symposium on Research in Security and Privacy, Oakland, May 20-22, 1991, Los Alamitos, IEEE Comp. Soc. Press, US, vol. SYMP. 12, May 20, 1991, pp. 8-20, XP010024210 ISBN: 0-8186-2168-0.
Wray J.C. Institute of Electrical and Electronics Engineers: "An analysis of convert timing channels" Proceedings of the Symposium on Research in Security and Privacy, Oakland, May 20-22, 1991, Los Alamitos, IEEE Comp. Soc. Press, US, vol. SYMP 12, May 20, 1991, pp. 2-7, XP010024209 ISBN: 0-8186-2168-0.
Bernstein D.J. "Cache-Timing Attacks On AES" CR.YP.TO, 2005, XP007901095.

* cited by examiner

*Primary Examiner*—Nitin C Patel
(74) *Attorney, Agent, or Firm*—Lisa K. Jorgenson; William R. McClellan; Wolf, Greenfield & Sacks, P.C.

(57) ABSTRACT

A method and a system of sharing of a clock by an electronic circuit between at least one first task clocked by at least one first counter and at least one second task clocked by a second counter, the two counters varying at the rate of said clock, the content of the first counter plus or minus an offset value being, on each execution of the second task, assigned to the second counter.

17 Claims, 2 Drawing Sheets

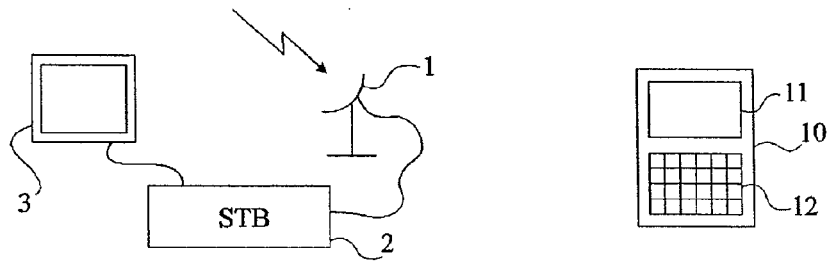
Fig 1
(Prior Art)
Fig 2
(Prior Art)
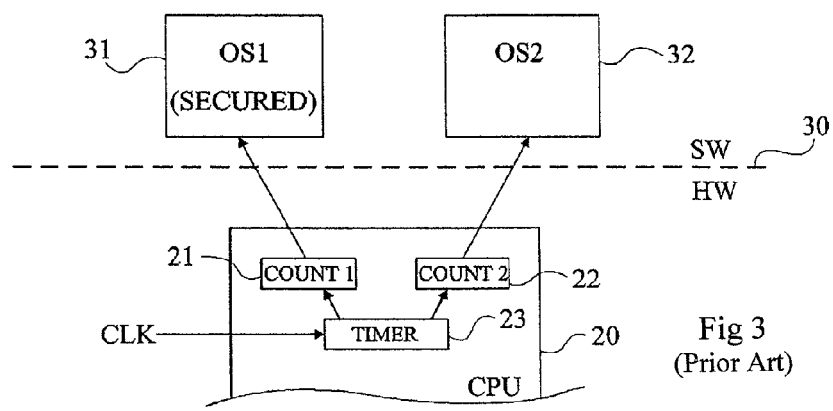
Fig 3
(Prior Art)
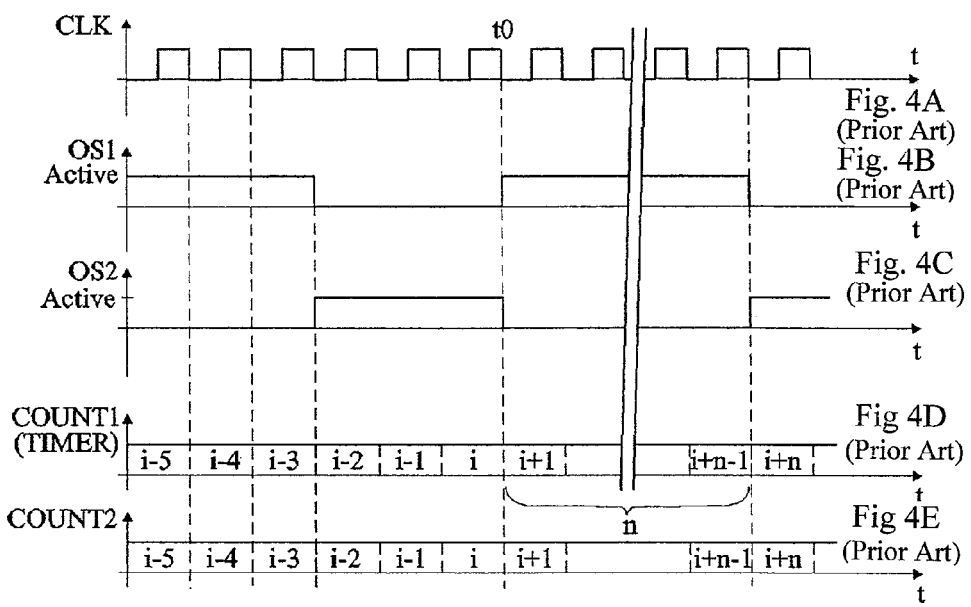
Fig. 4A
(Prior Art)
Fig. 4B
(Prior Art)
Fig. 4C
(Prior Art)
Fig 4D
(Prior Art)
Fig 4E
(Prior Art)

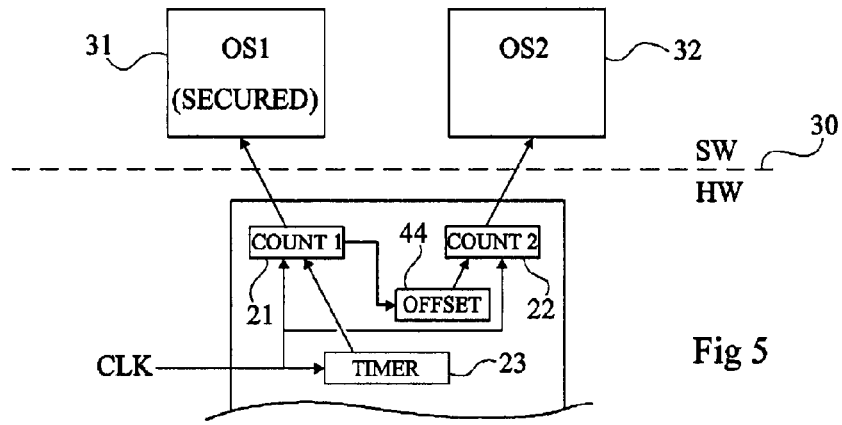
Fig 5
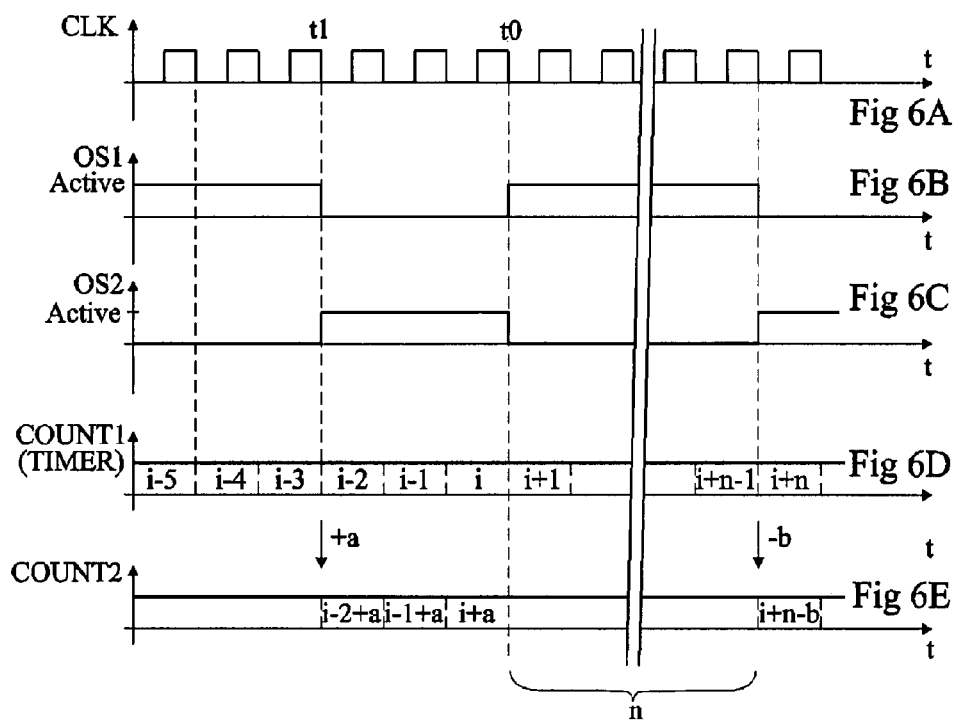
Fig 6A
Fig 6B
Fig 6C
Fig 6D
Fig 6E
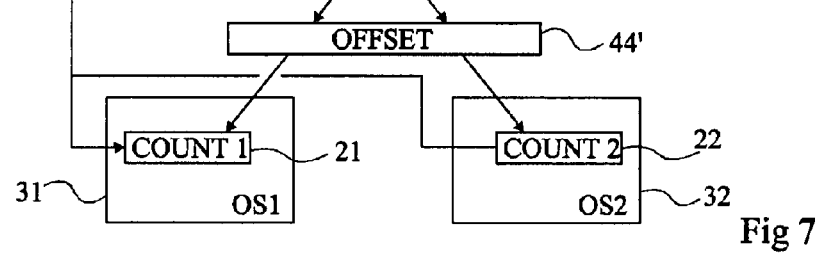
Fig 7

METHODS AND DATA PROCESSING SYSTEMS FOR SHARING A CLOCK BETWEEN NON-SECURED AND SECURED TASKS

BACKGROUND OF THE INVENTION

1. Field of the Invention

The present invention generally relates to digital processing circuits and, more specifically, to microprocessors capable of executing so-called secured tasks, that is, manipulating digital quantities intended to remain secret. These may be, for example, ciphering tasks using public key (asymmetrical) or secret key (symmetrical) mechanisms.

The present invention more specifically applies to digital data processing systems using at least two operating systems, among which is a secured operating system.

The present invention more specifically aims at the protection of a system sharing a time counter, against attacks by interpretation of the time for processing digital quantities to be protected. Such attacks are most often designated as timing attacks.

2. Discussion of the Related Art

FIG. 1 very schematically shows in the form of blocks a first example of application of the present invention to a controlled broadcasting system (for example, of subscriber television type). Signals received by an antenna 1 (for example, a satellite antenna) are decoded by a decoder 2 (STB for "Set Top Box") to be displayed on a television set 3. Decoder 2 contains digital processing circuits among which is at least one processor capable of executing deciphering tasks from a key integrated to the decoder or contained in a support, for example, a smart card readable by the decoder. Decoder 2 is capable of hosting not only secured applications linked to the decoding but also applications and/or an operating system which are not secured for, for example, presentation of the user interface of the screen, some game programs, etc.

FIG. 2 shows a second example of application of the present invention to a mobile phone 10, provided with a screen 11 and a keyboard 12. A secured exploitation system concerns, for example, the system for managing the rights of access to the communication network (for example, telephone) while a non secured operating system concerns, for example, the processing of images taken by an objective lens comprised by device 10, or any other program requiring no protection for execution.

Another example, not shown, of application of the present invention relates to personal microcomputers capable of operating under two different operating systems, one being considered as secured.

FIG. 3 very schematically shows, in the form of blocks, the conventional operation of a central processing unit 20 (CPU) of a processor of the type to which the present invention applies. In FIG. 3, the hardware (HW) and software (SW) layers have been separated by dotted lines 30.

From a hardware point of view, central processing unit 20 comprises a timer 23 clocked by a clock signal CLK and in charge of synchronizing the operation of the entire system. Timer 23 is considered as secured, in that the information that it contains on the number of used clock cycles is not directly accessible from the outside of the circuit.

A first operating system (block 31, OS1) considered as secured uses time counter 23 when it needs executing tasks which are assigned thereto. In certain cases, the first operating system directly uses counter 23 as a sequencer. In other cases, a register 21 defining a counter COUNT1 is used as a sequencer dedicated to the first exploitation system. This counter (COUNT1) is incremented at rate CLK of timer 23. A second operating system (block 32, OS2) considered as non-secured also uses timer 23 to update a counter COUNT2 stored in a register 22. Exploitation system 31 is considered as secured because the content of its clock register 21 is not accessible by the other exploitation system. Exploitation system 32 is considered not to be secured because the content of its clock register 22 are accessible by the two operating systems.

The making of central processing unit 20 available for one or the other of the operating systems is managed by a mechanism of hardware resource sharing according to various access priority rules. The clock registers dedicated to the different operating systems (especially that of the non-secured system) may be in the software layer.

FIGS. 4A, 4B, 4C, 4D, and 4E illustrate, in timing diagrams, an arbitrary example of distribution of the tasks between the two operating systems of FIG. 3, illustrating the problem of timing attacks. FIG. 4A shows clock signal CLK. FIG. 4B illustrates periods of activity of first operating system OS1. FIG. 4C illustrates periods of activity of second operating system OS2. FIG. 4D illustrates the content of timer 23 which is identical to that of clock register 21 (COUNT1) if existing. FIG. 4E illustrates the content of clock register 22 (COUNT2).

It is arbitrarily assumed that first operating system OS1 holds the lead during cycles i−5 and i−3 (FIG. 4D), that the second operating system holds the lead during cycles i−2 and i, and that a task critical from the point of view of security of the manipulated data is executed by the first operating system between cycles i+1 and i+n−1, the lead being returned to the second operating system from cycle i+n.

As illustrated in FIG. 4E, the content of register 22 just before time t0 when first system OS1 takes the lead for the critical task is i and this content, when the lead is returned thereto, is i+n. Since the content of register 22 is accessible, the number n of clock cycles for which the first operating system has held the lead for the execution of the critical tasks is thus available, even if the content of register 21 or of counter 23 is not accessible. Now, this number of cycles may be exploited to determine the value of the manipulated quantities, the time necessary to process a bit at state one being different from the time necessary to process a bit at state zero.

An example of timing attacks on an AES algorithm is described in article "Cache-timing attacks on AES" of Daniel J. Bernstein (Department of Mathematics, Statistics, and Computer Science—The University of Illinois—Chicago, Apr. 14, 2005, XP007901095).

A known solution to solve this problem is described in U.S. Pat. No. 5,994,917 and comprises the introduction of a pseudo-random character into the clock signal frequency. This amounts to providing two clocks different in hardware terms in the central processing unit, each clock being respectively assigned to one of the operating systems.

A problem is that the forming of a hardware clock dedicated to each operating system is not always possible.

SUMMARY OF THE INVENTION

The present invention aims at providing a method and a system for timing non-secured tasks on a processor simultaneously supporting a secured operating system and a non-secured operating system by means of a single hardware clock signal.

The present invention more specifically aims at allowing a protection against attacks by examination of the execution times of the secured tasks.

More generally, the present invention aims at making the times of execution of tasks by different operating systems unexploitable while allowing the use of a same hardware or software reference clock.

To achieve all or part of these objects, as well as others, the present invention provides a method of sharing a clock by an electronic circuit between at least one first task clocked by at least one first counter and at least one second task clocked by a second counter, the two counters being clocked at the rate of said clock, the content of the first counter plus or minus an offset value being, on each execution of the second task, assigned to said second counter.

According to an embodiment of the present invention, each counter is assigned to a different operating system of a processor.

According to an embodiment of the present invention, said first counter is a timer of the processor.

The present invention also provides a method for sharing a first value of a timer between at least one first counter for timing at least one first task and at least one second counter for timing at least one second task, said counters being clocked at the rate of a same clock and being updated with said first value plus or minus a second value which is different for each counter.

The present invention also provides a method for protecting the duration of at least one first task clocked by at least one first counter, by an analysis of the duration of at least one second task clocked by a second counter.

According to an embodiment of the present invention, said offset value is selected randomly.

The present invention also provides a system for sharing a clock between at least one first operating system clocked by at least one first counter and at least one second operating system clocked by a second counter.

The present invention also provides a microprocessor comprising such a system.

The present invention also provides a system for sharing a first value between at least one first counter for timing at least one first task and at least one second counter for timing at least one second task.

The foregoing and other objects, features, and advantages of the present invention will be discussed in detail in the following non-limiting description of specific embodiments in connection with the accompanying drawings.

BRIEF DESCRIPTION OF THE DRAWINGS

FIG. 1, previously described, shows an example of application of the present invention;

FIG. 2, previously described, shows a second example of application of the present invention;

FIG. 3, previously described, very schematically illustrates a conventional example of the sharing of a same processing unit by two operating systems;

FIGS. 4A, 4B, 4C, 4D, and 4E, previously described, illustrate in timing diagrams the operation of the system of FIG. 3;

FIG. 5 very schematically illustrates in the form of blocks a first embodiment of the present invention applied to the sharing of a same processing unit by two operating systems;

FIGS. 6A, 6B, 6C, 6D, and 6E illustrate, in timing diagrams, an embodiment of the present invention applied to the system of FIG. 5; and FIG. 7 very schematically shows in the form of blocks a second example of embodiment of the present invention applied to the protection of tasks executed by two operating systems.

DETAILED DESCRIPTION

The same elements have been designated with the same reference numerals in the different drawings. For clarity, only those steps and elements which are useful to the understanding of the present invention have been shown in the drawings and will be described hereafter. In particular, the elements that enable passing data from one operating system to the other have not been described in detail, the present invention being compatible with any known method or system. Further, the actual mechanisms for processing the tasks executed by the different operating systems have not been described in detail either, the present invention being here again compatible with conventional mechanisms.

The present invention will be described hereafter in relation with an example of application to tasks executed for different operating systems. It more generally applies to a sharing of the same clock reference (clock signal or hardware or software timer) by different programs (different tasks). Unless otherwise mentioned, all that will be described in relation with different operating systems applies to the execution, by several instances (executions) of the same operating system, of different application programs.

FIG. 5 very schematically shows in the form of blocks, in a view to be compared with FIG. 3, an embodiment of a system according to the present invention. As previously, dotted lines 30 distinguish hardware layer HW from software layer SW of the system and two exploitation systems (blocks 31, OS1, and 32, OS2), respectively secured and non-secured, have access to the same hardware processor 20 (CPU) that they share.

On the side of central processing unit 20, a clock signal CLK clocks a timer 23 used by the central processing unit to execute the instructions coming from the two operating systems. This counter is considered as secured, that is, its content is not accessible at least by the second operating system.

According to the example of FIG. 5, a first clock register 21 (COUNT1) is assigned to first operating system 31 and a second clock register 22 (COUNT2) is assigned to second operating system 32. The two registers 21 and 22 are clocked by the same clock signal CLK as general counter 23. Register 21 is used to sequence the tasks of system 31 and is accessible neither in read mode, nor in write mode by system 32. Register 22 is used to sequence the tasks of system 32 and is not secured. It is thus accessible and modifiable by the two operating systems.

During tasks executed by the first operating system, register 21 contains the same value as counter 23. However, during tasks executed by the second operating system, its clock register 22 is loaded with a value different from that of counter 23. For example, on each assignment of the central processing unit to the second operating system, register 22 is loaded with the value of register 21 incremented or decremented by a number of clock cycles. This function has been illustrated in FIG. 5 by a connection between registers 21 and 22 on which is interposed a function 44 (OFFSET) of increment or decrement by a variable number (preferably randomly selected on each assignment of the central processing unit of the non-secured operating system). The value provided by function 44 is not accessible by the non-secured operating system.

Accordingly, the number contained in register 22 dedicated to the second operating system provides no indication as to the number of cycles used by the first one.

As a variation, counter 23 is directly used by the first operating system. Its content, when it is transferred to clock register 22, is then increased or decreased by the variable number of cycles by function 44.

FIGS. 6A to 6E illustrate, in timing diagrams to be compared with those of FIGS. 4A to 4E, the operation of the system of FIG. 5. FIG. 6A shows an example of the shape of clock signal CLK. FIGS. 6B and 6C show examples of assignment of the central processing unit to operating systems OS1 and OS2, respectively. FIG. 6D shows the content of clock register 21 (COUNT1), identical to that of timer 23. FIG. 6E illustrates the content of clock register 22 (COUNT2).

As previously, the execution, from a time t0, of tasks critical as to the security of the data that they manipulate, by the first operating system, for a number n−1 of clock cycles, is assumed.

As previously still, it is assumed that the central processing unit is assigned to the first operating system during cycles i−5 to i−3 and to the second operating system for the next three cycles.

According to this embodiment of the present invention, register 22 is loaded with value i+a−2 at the time (t1) when the second operating system must take the lead. Value a is the value provided by function 44. Accordingly, just before time t0 when the first operating system takes back the lead, the content of register 22 is i+a instead of i in the conventional system.

Register 21 contains the value of the secured clock (absolute time) and its value is not modified. Accordingly, from time t0, the value of counter COUNT1 is i+1 for the execution of the n cycles by the first operating system.

At the end of this execution, it is assumed that the second operating system takes back the lead. Register 22 is then loaded with the value corresponding to that of counter COUNT1, decremented by a value b. As a result, the accessible value contained in register 22 is i+n−b, instead of i+n.

Accordingly, the examination of values i+n−b and i+a contained in register 22 at the end and at the beginning of the execution of the n critical cycles by the first operating system does not enable determining this number n.

The selection between an increment and a decrement on each assignment of the processing unit to the second operating system is, for example, random. In the case of a decrement, it will preferentially be ascertained that the value (b) is lower than the number (n) of cycles during which the first system just took the lead to preserve the progression direction of clock register 22.

FIG. 7 very schematically illustrates in the form of blocks a variation of the present invention applied to the use of different values for clock registers 21 and 22 respectively assigned to two operating systems 31 (OS1) and 32 (OS2). In the example of FIG. 7, the case of a virtual machine (block 60) providing a reference clock value (block 45, REFCLK) of a timer is considered. Each time this value must be used to initialize or update the clock register of one of the operating systems, an offset (block 44) is applied to value REFCLK of register 45 to define the value of the concerned clock register. Clock registers 21 and 22 are then alternately used by the different operating system instances.

An advantage of the present invention is that it enables sharing a same reference clock for several operating systems by protecting the execution of tasks by at least one of the systems against timing attacks.

Of course, the present invention is likely to have various alterations, improvements, and modifications which will readily occur to those skilled in the art. In particular, although the present invention has been described in relation with an example with two operating systems, it more generally applies whatever the number of implemented operating systems. Further, although term "register" has been used to designate the elements containing the counter values, these elements may be any storage element, volatile or not, provided that it is rewritable. Further, all that has been described in relation with timing counters incremented at the rate of the shared clock also applies to counters decremented at the rate of this clock. Finally, the practical implementation of the present invention, be it by hardware or software means, is within the abilities of those skilled in the art based on the functional indications given hereabove.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method executed by a central processing unit of sharing of a clock by an electronic circuit between at least one first task clocked by at least one first counter and at least one second task clocked by a second counter, the two counters being clocked at the rate of said clock, wherein, on each execution of the second task, the content of the first counter plus or minus a randomly selected offset value is assigned to said second counter.

2. The method of claim 1, wherein each counter is assigned to a different operating system of a processor.

3. The method of claim 2, wherein said first counter is a timer of the processor.

4. A method executed by a central processing unit for sharing a first value of a timer between at least one first counter for timing at least one first task and at least one second counter for timing at least one second task, said counters being clocked at a rate of a same clock and being updated with said first value plus or minus a second value which is different for each counter and which is randomly selected.

5. A method executed by a central processing unit for protecting the duration of at least one first task clocked by at least one first counter, by an analysis of a duration of at least one second task clocked by a second counter, the first and second counters being clocked at a rate of a same clock, wherein, on each execution of the second task, a content of the first counter plus or minus a randomly selected offset value is assigned to the second counter.

6. A system for sharing a clock between at least one first operating system clocked by at least one first counter and at least one second operating system clocked by a second counter, comprising first and second counters, means for clocking the first and second counters at a rate of a same clock and means for assigning to the second counter, on each execution of the second task a content of the first counter plus or minus a randomly selected offset value.

7. The system of claim 6 comprising a microprocessor.

8. A system for sharing a first value between at least one first counter for timing at least one first task and at least one second counter for timing at least one second task, comprising first and second counters, means for clocking the first and second counters at a rate of a same clock and means for updating the first and second counters with the first value plus or minus a second value which is different for each counter and which is randomly selected.

9. A method executed by a central processing unit for sequencing an electronic circuit, comprising:
   clocking first and second counters with a clock;
   sequencing a first task executed by the electronic circuit with the first counter;
   sequencing a second task executed by the electronic circuit with the second counter; and
   updating the second counter with a value in the first counter plus or minus a randomly selected offset value.

10. The method of claim 9, wherein each of the first and second counters is assigned to a different operating system of a processor.

11. The method of claim 10, wherein the first counter is a timer of the processor.

12. The method of claim 9, wherein the second counter is non-secured in the electronic circuit.

13. A method executed by a central processing unit for sequencing an electronic circuit, comprising:
   clocking first and second counters with a clock;
   sequencing a first task executed by the electronic circuit with the first counter;
   sequencing a second task executed by the electronic circuit with the second counter; and
   updating the first and second counters with a reference value plus or minus a randomly selected offset value which is different for the first and second counters.

14. The method of claim 13, further comprising clocking a reference counter with the clock, the reference counter containing the reference value.

15. The method of claim 13, wherein each of the first and second counters is assigned to a different operating system of a processor.

16. The method of claim 15, wherein the first counter is a timer of the processor.

17. The method of claim 13, wherein the second counter is non-secured in the electronic circuit.

* * * * *

UNITED STATES PATENT AND TRADEMARK OFFICE
CERTIFICATE OF CORRECTION

PATENT NO. : 7,779,289 B2  Page 1 of 1
APPLICATION NO. : 11/707228
DATED : August 17, 2010
INVENTOR(S) : William Orlando et al.

It is certified that error appears in the above-identified patent and that said Letters Patent is hereby corrected as shown below:

On the title page, item (30) should read:
(30)    Foreign Application Priority Data
Feb. 15, 2006   (FR) .....................06 50541

Signed and Sealed this

Fifth Day of October, 2010

David J. Kappos
*Director of the United States Patent and Trademark Office*